United States Patent [19]

Pagano

[11] Patent Number: 5,445,336
[45] Date of Patent: Aug. 29, 1995

[54] INTERNAL FILM DRIVE FOR THRUSTING FILM CARTRIDGE

[75] Inventor: Daniel M. Pagano, Henrietta, N.Y.

[73] Assignee: Eastman Kodak Company, Rochester, N.Y.

[21] Appl. No.: 189,011

[22] Filed: Jan. 28, 1994
(Under 37 CFR 1.47)

[51] Int. Cl.⁶ ............................................. G03B 17/26
[52] U.S. Cl. .................................................. 242/348.3
[58] Field of Search ................. 242/348, 348.1, 348.3; 359/275; 352/78 R

[56] References Cited

U.S. PATENT DOCUMENTS

| | | |
|---|---|---|
| 2,595,898 | 5/1952 | Siedenburg . |
| 2,710,727 | 6/1955 | Orowick . |
| 4,834,306 | 5/1989 | Robertson et al. . |
| 5,031,852 | 7/1991 | Dowling et al. ............... 354/275 X |
| 5,031,855 | 7/1991 | Wolf et al. ....................... 242/348.3 |
| 5,083,721 | 1/1992 | Okutsu et al. ..................... 242/348 |
| 5,277,374 | 1/1994 | Zander et al. .................... 242/348.3 |
| 5,278,600 | 1/1994 | Takahashi et al. ................ 354/275 |
| 5,295,634 | 3/1994 | Zander et al. ..................... 242/348 |
| 5,337,971 | 8/1994 | Niedospial, Jr. .................. 242/348 |

Primary Examiner—John P. Darling
Attorney, Agent, or Firm—Roger A. Fields; J. Addison Mathews

[57] ABSTRACT

A film cartridge is provided with an internal mechanism for engaging and pulling a leading end of film from a roll to extend the film through a cartridge exit port. A one-way clutch, including a rotational element captured in a ramped cage, moves in one direction to capture the film between the ball and cage and advance the film through the exit. Movement in the opposite direction releases the film and repositions the clutch for the next advance. Still more specifically, the cartridge includes a second and opposite working one-way clutch for preventing premature retraction of the film. A release mechanism is employed for disabling both clutches when desired for intentional rewinding.

10 Claims, 4 Drawing Sheets

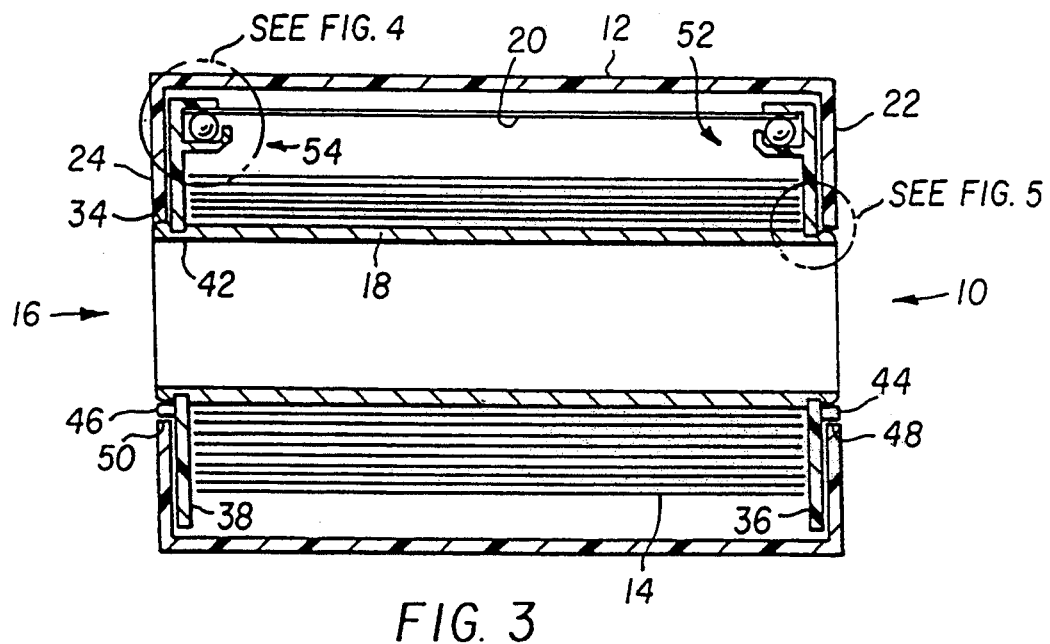
FIG. 3
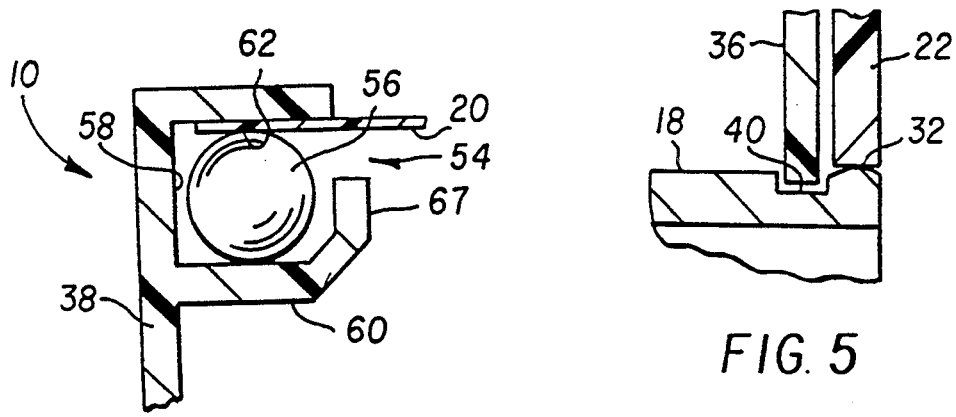
FIG. 4
FIG. 5
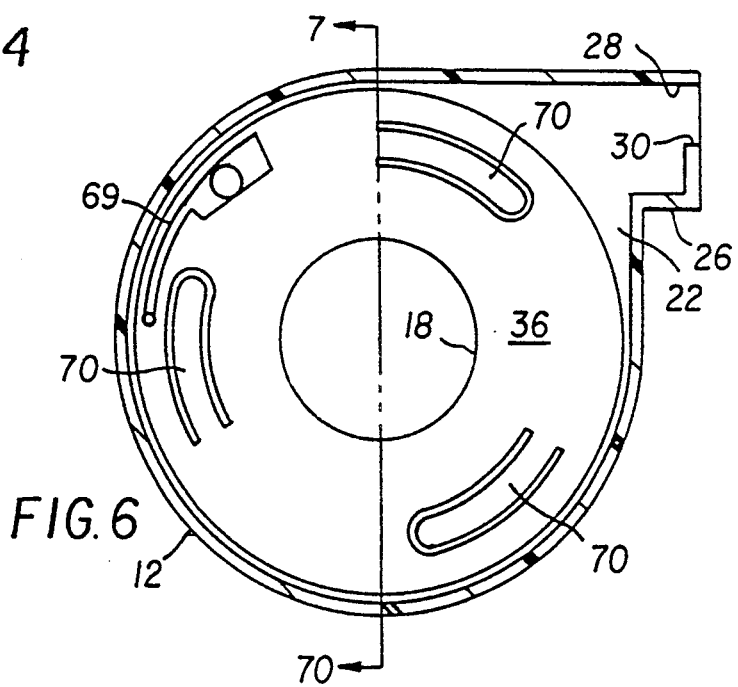
FIG. 6

INTERNAL FILM DRIVE FOR THRUSTING FILM CARTRIDGE

BACKGROUND OF THE INVENTION

1. Field of Invention

The invention relates to photography, and to a film cartridge including an internal mechanisms for extending film from the cartridge through an exit port. More specifically, the invention relates to a film handling device having one mode for thrusting film from a cartridge, and another mode for releasing the film to permit rewinding of the film back into the cartridge.

2. Description of the Prior Art

Most single-spool film cartridges are assembled with a leading end of the film extending through an exit slot in the cartridge shell. This leading end is accessible when the film is loaded in a camera, and is used for threading the film and pulling it incrementally from the shell as exposures are made. When fully exposed, the film is returned to the cartridge by rewinding, including the leading end, to protect the film for removal from the camera. During subsequent processing, the film is released from the cartridge by breaking open the shell. The extended leading end is no longer required for access to the film.

More recent disclosures include single-spool cartridges, sometimes called thrust cartridges, that contain the entire film roll, including the leading end, inside the cartridge shell. Typically the film roll is supported on a spool that is rotated in an unwinding direction to push the film through its convolutions until the leading end is thrust out the exit slot. Internal structures and mechanisms are provided to reduce clock-springing of the convolutions, so the film will follow the intended path without buckling. This approach is used in cameras to access the film, and may be used again during development and printing. The film remains forever attached to the cartridge, or is returned to the cartridge after processing. The cartridge remains intact and is reused for returning the processed film to the customer.

An example of a thrusting film cartridge is disclosed in Robertson et al. U.S. Pat. No. 4,834,306, issued May 30, 1989. According to the Robertson et al. disclosure, film supported on a spool inside a cartridge is rotated in an unwinding direction to extend the film through a cartridge exit slot. Clock-springing is controlled by confining the outermost convolutions of the film to the intended path.

PROBLEM SOLVED BY THE INVENTION

Prior art thrusting cartridges, while satisfactory for the purposes intended, are unduly sensitive to temperature and humidity variations and require undesirably tight dimensional tolerances. Successful operation depends on precise interaction between the film and several rather delicate cartridge parts. During manufacture the parts must be positioned carefully both in the cartridge and relative to the film convolutions. After manufacture, rough handling can destroy the required relationships.

Previous approaches also tend to require a high thrusting torque required to push the film out of the cartridge from the inner spool. Higher torque in automated cameras means larger drive motors and batteries, and shorter battery life.

SUMMARY OF THE INVENTION

The present invention is directed to overcoming one or more of the problems set forth above. Briefly summarized, according to one aspect of the invention, a film cartridge, containing a roll of film, is provided with an internal mechanism for engaging and pulling an outermost convolution of the roll to extend the film through a cartridge exit port.

More specific features include a one-way clutch having a ball or circular element captured in a ramped cage. Relative movement in one direction captures the film between the ball and the cage to advance the film. Movement in the opposite direction releases the film and repositions the clutch for the next advance.

Still more specifically, the cartridge includes a second and opposite working one-way clutch for preventing premature retraction of the film. A release mechanism is employed for disabling both clutches when desired for intentional rewinding.

ADVANTAGEOUS EFFECTS OF THE INVENTION

A low torque film advancing mechanism is provided that is simple and operates reliably with few additional parts compared to basic existing cartridges. It is insensitive to temperature and humidity variations, and permits generous part tolerances without reducing reliability. Neither film thickness nor film base material are critical to proper operation.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIG. 3 is a cross-sectional view taken along the line 3—3 in FIG. 1, illustrating the mating relationships between the cartridge shell and a film spool supported therein.

FIG. 4 is an enlarged view of a portion of FIG. 3, as identified in FIG. 3, showing a ball and cage according to the preferred embodiment.

FIG. 5 is an enlarged view of a portion of FIG. 3, as identified in FIG. 3, showing details of a spool core and flange according to the preferred embodiment.

FIGS. 6 and 7 are cross-sectional views depicting an additional feature according to the preferred embodiment for restraining undesired retraction of the film during operation of the advancing mechanism. FIG. 7 is taken along the line 7—7 in FIG. 6.

FIG. 9 is taken along section lines 9—9 in FIG. 8.

DESCRIPTION OF THE PREFERRED EMBODIMENTS

Figure 1:
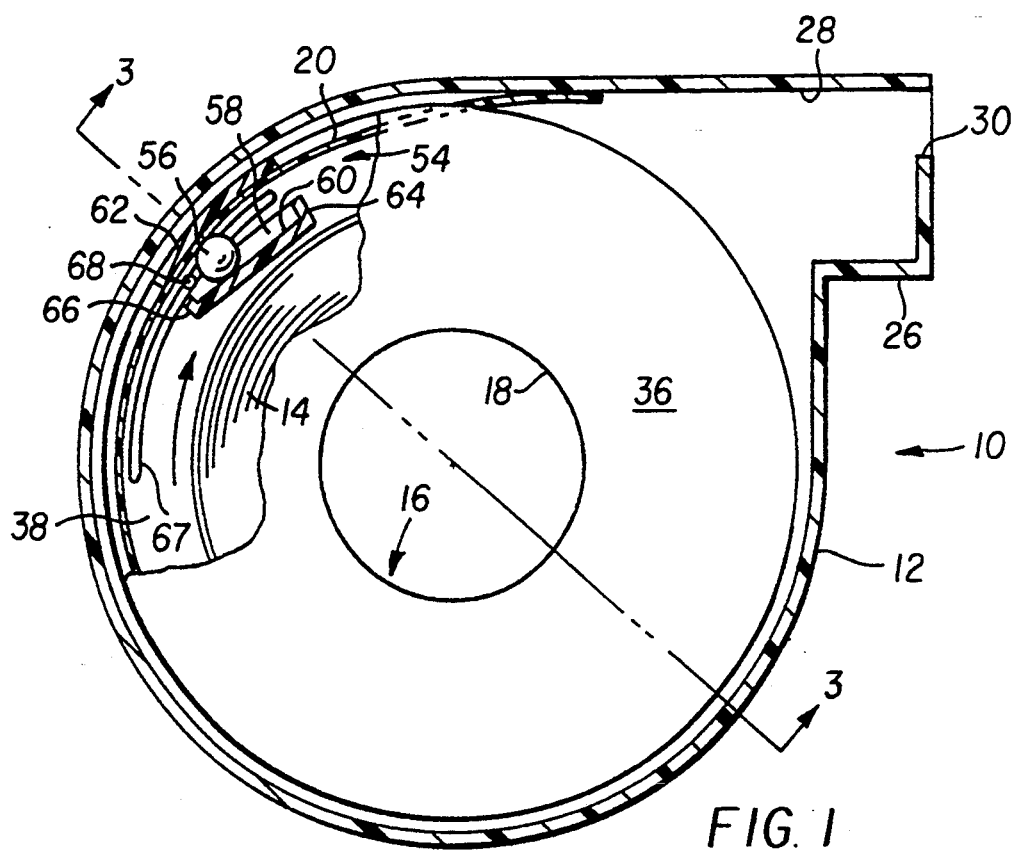
FIG. 1 is a cross-sectional end view of a film cartridge according to the invention, depicting a cartridge shell, a film roll in the shell, and a clutch mechanism for engaging outermost convolutions of the film roll to advance the film through an exit port.
Figure 2:
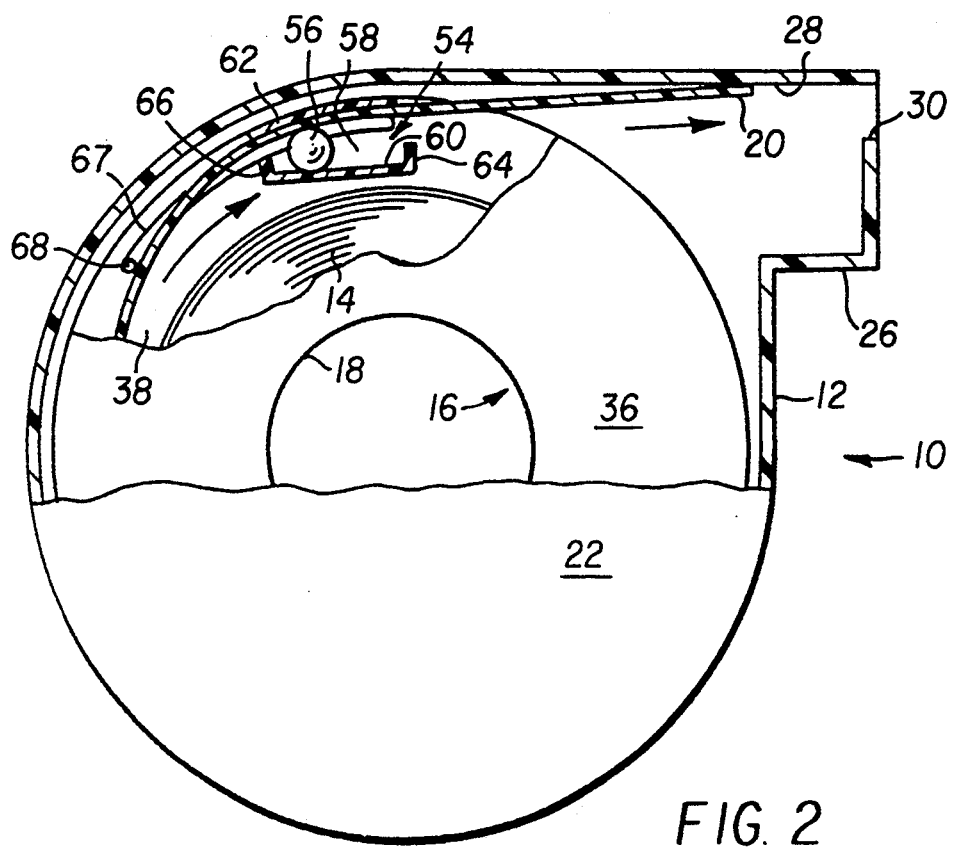
FIG. 2 is a cross-sectional view corresponding to FIG. 1, but illustrating a different operational position of the film advancing mechanism.

Referring now to FIGS. 1-5, a preferred embodiment of the invention is depicted in a film cartridge 10 having an exterior shell 12 containing a roll 14 of photographic film. The film roll is supported on a spool 16 with an inner-most convolution engaging the spool core 18 and outermost convolutions proximate the shell. The entire film roll, including its leading end 20, is contained within the confines of the shell 12.

The shell 12 is illustrated as a cylindrical body having flat ends 22 and 24 (FIG. 3) and a snout 26. The snout extends tangentially from the body, between the ends, forming a film conduit 28 and exit port 30. It guides the film from the roll to the exit port when the film is advanced and extended from the cartridge. The exit port is an elongate slot covered with material or a gate (not shown) for blocking light from entering the cartridge through the exit port.

The shell 12 also supports the spool 16 for rotation, with annular bearing surfaces 32 and 34 (FIGS. 3 and 5) on the spool received in corresponding openings in the shell. Rotation of the spool 16 in one direction, clockwise in FIG. 1, occurs when the film is extended from the cartridge and advanced incrementally by the camera during exposures. Rotation in the opposite direction occurs when the film is rewound into the cartridge to protect it for removal from the camera. Rotation in both directions occurs freely, but with sufficient friction to prevent unwanted movement during handling outside the camera.

Opposed radial flanges 36 and 38 are supported in radial recesses 40 and 42 at opposite ends of the spool. The flanges are spaced apart slightly greater than the width of the film, and extend normal to the rotational axis of the spool, substantially parallel to and just inside the cartridge end walls 22 and 24. Although the flanges are supported on the spool, they are free to rotate separately from each other and from the spool. As previously described, the spool rotates substantially unconstrained with the film, at least until either end reaches the intended final position. The flanges, on the other hand, are limited to movement within angles of approximately forty five degrees (45°) in the case of flange 38 and only a few degrees in the case of flange 36. Of course the permitted angles could be different in other embodiments. It should be noted in connection with FIG. 3 that pins 44 and 46 extend from flanges 36 and 38, respectively, into arcade recesses or slots 48 and 50 in the cartridge shell 12. These pins and slots define the limits of flange rotation.

The flanges each carry, at their outer peripheries, opposite working one-way clutches 52 and 54. The clutch 54 on flange 38 is adapted to engage an end section of the film at one of its outermost convolutions and to reciprocate within the limits of its angular movement. During reciprocation in one direction, the clutch 54 grips the film and pulls it from the roll to extend the leading film end out through the cartridge exit slot. During movement in the opposite direction, the clutch 54 releases the film and moves along the film returning toward the core end. The other flange 36 does not move at this stage. Its clutch 52, which is opposite working, permits movement of the film out of the cartridge but prevents retraction of the film that otherwise might occur when the first clutch returns.

Figure 9:
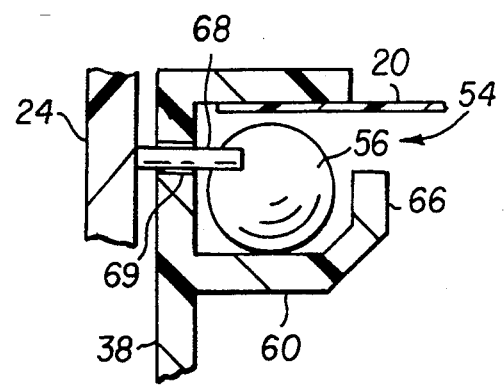
FIGS. 8 and 9 are enlarged cross-sectional views similar to FIGS. 1 and 4, depicting the operation of the preferred embodiment for rewinding the film into the cartridge.
Figure 8:
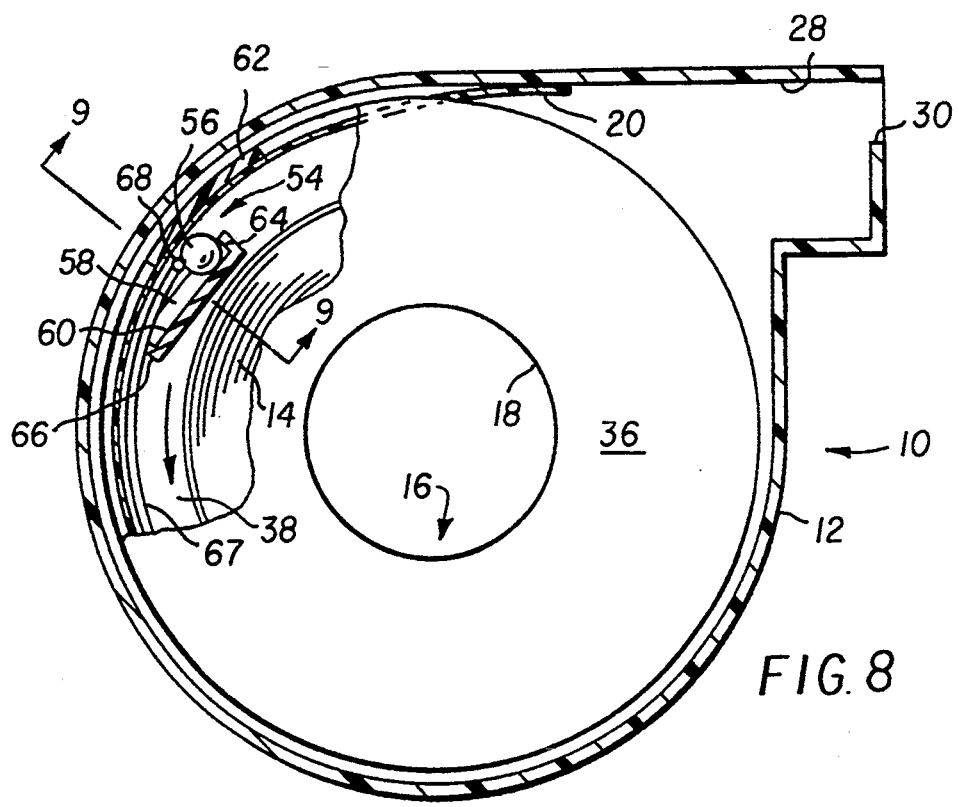

Although opposite working, the clutches 52 and 54 are essentially identical, and only one will be described in detail. It includes a rotating element, such as a ball 56, in a cage 58. The cage is defined by axial projections facing inwardly from the flange, forming an inclined ramp 60 and opposed trapping abutment 62. The leading end of the film, or one of its outer convolutions, is threaded between the ball and the trapping abutment. The distance between the ramp 60 and abutment 62 at one end 64 of the cage is greater than the diameter of the ball plus the thickness of the film. Therefor, the clutch releases the film when the ball rotates toward this larger end. At the other end 66 of the cage, the distance is reduced to less than the combined ball diameter and film thickness. Rotation of the ball toward the reduced end traps the film between the ball 56 and the abutment 62. A lip 67 (FIG. 4) on ramp 60 keeps the ball in the cage. A release pin 68, shown most clearly in FIG. 9, is positioned to disable both clutches for rewinding the film, as will be described hereinafter in connection with FIG. 8 and 9.

FIGS. 1 and 6 depict the flanges as they might start, with both clutches 52 and 54 in an initial position. From there, flange 38 (FIG. 1) and its clutch 54 are reciprocated to move through an angle of approximately forty five degrees (45°) between the positions illustrated in FIG. 1 and FIG. 2. Movement toward the position of FIG. 2 rotates the ball 56 counter-clockwise, toward the narrow end of the cage, captures the film between the ball and the trapping abutment 62 and pulls the leading end of the film from the roll to extend the film through the cartridge exit port 30. Movement of flange 38 back to the position of FIG. 1 has the opposite effect, rotating the ball toward the wide end of the cage and releasing the film.

The clutch 52 on flange 36 is opposite working. When the film is extended through the exit port, the ball in clutch 52 rotates toward the wide end of the cage, releasing the film. Should the film tend to move back into the cartridge, however, when the first flange returns to the position of FIG. 1, such film movement will roll the ball of clutch 52 toward the narrow end of its cage, trapping the film and preventing its return.

Figure 7:
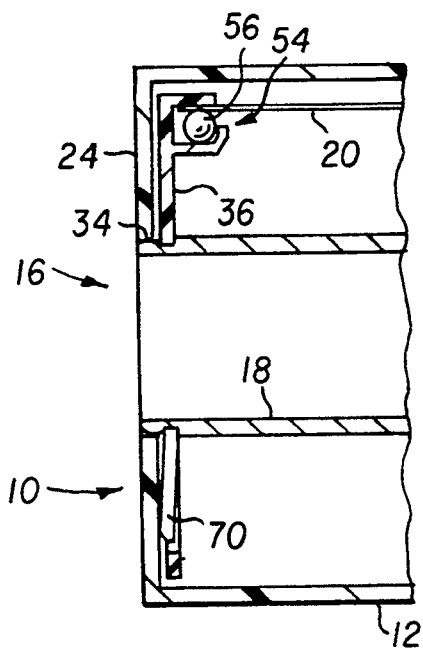

Flange 36 does not move from its starting position at this stage. Movement is restricted by friction, as depicted in FIGS. 6 and 7. Spring fingers 70 exert a bias against cartridge end wall 22, holding the flange in position.

Reciprocation of flange 38 is repeated, if necessary, until mechanisms in a camera, or other associated equipment, are able to engage the leading film end and take over control. Such equipment then continues to pull the film from the cartridge. During this stage, the clutches provide little resistance, since movement of the film out of the cartridge through the exit port rolls the balls in both clutches toward the wide ends of their corresponding cages, with very little resistance.

After the film is exposed, or other processing is complete, the film is rewound into the cartridge shell. The spool 16 is rotated, pulling the film back into the cartridge. Initially, both clutches grip the film and move counterclockwise (FIGS. 1 and 8) with the film to the positions depicted in FIG. 8. When they reach the position of FIG. 8, pins 68, supported in cartridge end walls 22 and 24, extend into the cages of both clutches and force the balls toward the wide ends (FIG. 9), releasing the film for further rewinding.

Figure 10:
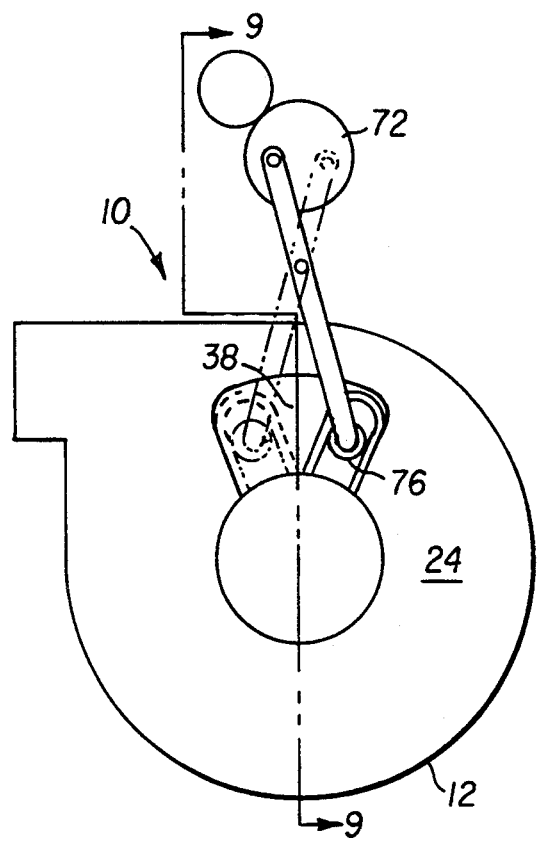
FIGS. 10 and 11 are schematic views of a camera mechanism for operating the film advancing mechanism to extend film from the cartridge.
Figure 11:
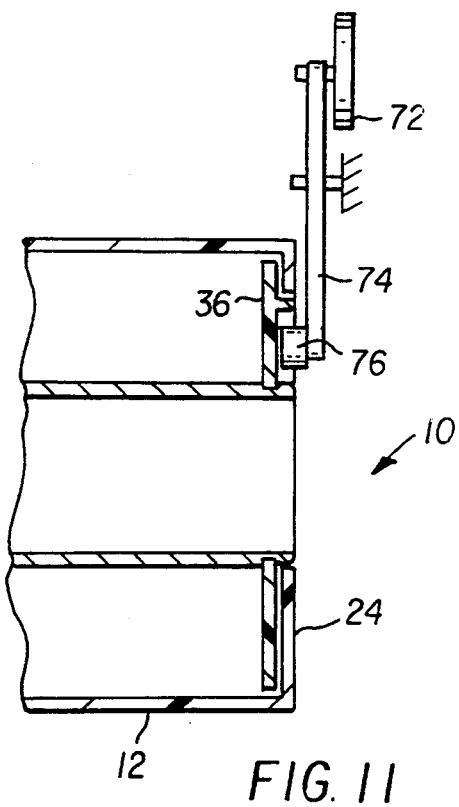

FIGS. 10 and 11 show an example of a camera mechanism for reciprocating flange 38 between the film advancing positions. A crank 72, driven by the camera, operates through a lever arm 74 and lost-motion linkage 76 to convert rotary motion of the crank into reciprocation of the flange. The mechanism is retracted after the leading end is extended and control is assumed by other camera mechanisms.

DESCRIPTION OF ALTERNATIVE EMBODIMENT

Figure 12:
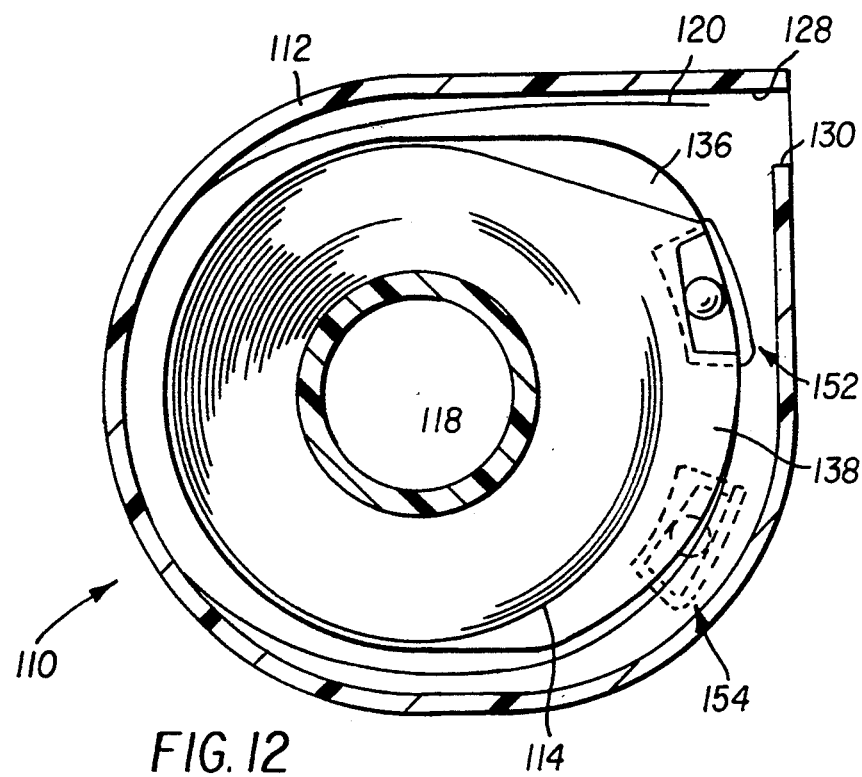
FIG. 12 is an alternative embodiment of the cartridge permitting a smaller cartridge shell.

FIG. 12 depicts an alternative embodiment that is preferred for smaller cartridges. The clutches are the same in design, but are located under the cartridge exit. This small space is adequate because of the small angle of rotation, approximately forty five degrees (45°), required for satisfactory operation of the film advancing mechanism. Like elements in this embodiment are identified by the same numerals as the preferred embodiment, preceded by a one (1) in the hundreds position.

While the invention has been described with particular reference to a preferred and alternative embodiment, it will be understood by those skilled in the art that other modifications and applications will readily occur to those skilled in the art. It is intended that the claims shall cover all such modifications and applications that do not depart from the true spirit and scope of the invention.

PARTS LIST FOR FIGURES

| Reference No. | Part |
| --- | --- |
| 10. | Film cartridge. |
| 12. | Exterior shell. |
| 14. | Film roll. |
| 16. | Spool. |
| 18 | Spool core. |
| 20. | Leading film end. |
| 22. | Cartridge flat end. |
| 24. | Cartridge flat end. |
| 26. | Cartridge snout. |
| 28. | Film conduit. |
| 30. | Exit port. |
| 32. | Bearing surface. |
| 34. | Bearing surface. |
| 36. | Flange. |
| 38. | Flange. |
| 40. | Radial recess. |
| 42. | Radial recess. |
| 44. | Pin. |
| 46. | Pin. |
| 48. | Slot. |
| 50. | Slot. |
| 52. | One-way clutch. |
| 54. | One-way clutch |
| 56. | Ball. |
| 58. | Cage. |
| 60. | Ramp. |
| 62. | Abutment. |
| 64. | One end. |
| 66. | Other end. |
| 67. | Lip |
| 68. | Release pin. |
| 70. | Spring fingers. |
| 72. | Crank. |
| 74. | Lever arm. |
| 76. | Lost motion linkage. |
| 110. | Film cartridge. |
| 112. | Exterior shell. |
| 114. | Film roll. |
| 118. | Spool core. |
| 120. | Leading film end. |
| 128. | Film conduit. |
| 130. | Exit port. |

-continued

PARTS LIST FOR FIGURES

| Reference No. | Part |
| --- | --- |
| 136. | Flange. |
| 138. | Flange. |
| 152. | One-way clutch. |
| 154. | One-way clutch |

What is claimed is:

1. A film cartridge including a roll of photographic film contained in a shell having an exit port, the film including outermost convolutions, characterized in that:
   the film is extended through the exit port by a one-way clutch including a ball captured in a ramped cage inside said shell, said one-way clutch engaging the film at said outermost convolutions and pulling the film from the roll.

2. A film cartridge comprising:
   a roll of photographic film including an innermost convolution and outer convolutions;
   a shell containing said film and defining a film exit port; and,
   a one-way clutch engaging the film inside the cartridge at the outer convolutions for pulling the film from the roll and extending the film through said exit port, said one-way clutch including a circular element captured in a ramped cage inside said shell.

3. The invention of claim 2, including a spool supporting the innermost film convolutions, and at least one flange supported in said shell for angular movement about an axis passing through said spool, and wherein said one-way clutch is supported on said flange.

4. A film cartridge including a roll of photographic film contained in a shell having an exit port, the film including outermost convolutions: characterized in that:
   a first one-way clutch reciprocates in one direction to extend the film through the exit port by engaging the film inside said shell at said outermost convolutions and pulling the film from the roll, said first one-way clutch reciprocates in an opposite direction to advance the clutch along the film, and
   a second opposite working one-way clutch prevents film movement with the first clutch in the opposite direction.

5. The invention of claim 4, including means for releasing said second one-way clutch to permit rewinding of the film into said shell.

6. A film cartridge comprising:
   a roll of photographic film having first and second opposed film faces extending between film edges and including a trailing end and an opposite leading end;
   a spool engaging the trailing end and supporting the roll;
   a shell containing the spool and roll with the leading end inside said shell, said shell defining a film exit port; and,
   a film gripper supported inside said shell and engaging the leading end of the film, said gripper having first and second opposed elements engaging the film from opposite faces, said first and second opposed elements moving with the leading film end for pulling the film from the roll and advancing the leading end through said exit port.

7. The invention of claim 6 wherein said film gripper is a one-way clutch that reciprocates toward the exit port to advance the leading end through the port and away from the exit port to move along the film toward the trailing end.

8. The invention of claim 6, including opposed flanges coaxial with said spool at opposite ends thereof, and wherein said film gripper is a one-way clutch supported on at least one of said flanges.

9. The invention of claim 6, including first and second opposed flanges coaxial with said spool at opposite ends thereof, and wherein said film gripper includes two opposite working one-way clutches, supported, respectively, on said first and second flanges.

10. The invention of claim 9, wherein said one-way clutches include a ball in a ramped cage inside said shell.

* * * * *